US005894671A

United States Patent [19]

Karapetian

[11] Patent Number: 5,894,671

[45] Date of Patent: Apr. 20, 1999

[54] COMPASS WITH ANGLE TRISECTING CAPABILITY

[76] Inventor: Edgar Karapetian, 431 A Broadway, Apt. 25, Somerville, Mass. 02145

[21] Appl. No.: 08/790,277

[22] Filed: Jan. 28, 1997

Related U.S. Application Data

[XX .

[60] Provisional application No. 60/010,718, Jan. 29, 1996.

[51] Int. Cl.[6] .......... G01B 5/24

[52] U.S. Cl. .......... 33/27.02; 33/1 AP; 33/27.031; 33/453; 33/465

[58] Field of Search .......... 33/27.02, 1 F, 33/1 G, 1 AP, 26, 27.01, 27.03, 27.031, 27.032, 452, 453, 456, 458, 465, 495; 434/211, 215

[56] References Cited

U.S. PATENT DOCUMENTS

| | | | |
|---|---|---|---|
| 717,871 | 1/1903 | Leitschuh | 33/27.02 |
| 1,010,612 | 12/1911 | Garinger . | |
| 1,109,479 | 9/1914 | Steed . | |
| 1,145,369 | 7/1915 | Kaplan . | |
| 1,243,343 | 10/1917 | Roberts . | |
| 1,294,935 | 2/1919 | Milliken . | |
| 2,222,853 | 11/1940 | Neurohr . | |
| 2,685,739 | 8/1954 | Cole . | |
| 2,892,586 | 6/1959 | Graham . | |
| 3,224,097 | 12/1965 | Izumi . | |
| 3,370,354 | 2/1968 | Schiff . | |
| 3,535,788 | 10/1970 | Sena . | |
| 3,693,261 | 9/1972 | Moore . | |
| 3,740,779 | 6/1973 | Rubricuis . | |
| 3,881,255 | 5/1975 | Pantek . | |
| 3,906,638 | 9/1975 | Romano . | |
| 3,919,777 | 11/1975 | Moore . | |
| 3,957,199 | 5/1976 | Hunter . | |
| 4,776,100 | 10/1988 | Brumley . | |
| 4,866,848 | 9/1989 | Agelidis . | |
| 5,210,951 | 5/1993 | Chen . | |
| 5,383,276 | 1/1995 | Izumi . | |

FOREIGN PATENT DOCUMENTS

| | | | |
|---|---|---|---|
| 66217 | 4/1892 | Germany | 33/1 AP |
| 1281865 | 1/1987 | U.S.S.R. | 33/783 |
| 18316 | 2/1901 | United Kingdom | 33/1 AP |
| 104282 | 3/1917 | United Kingdom | 33/1 AP |

*Primary Examiner*—Christopher W. Fulton
*Attorney, Agent, or Firm*—Hamilton, Brook, Smith & Reynolds, P.C.

[57] ABSTRACT

A new geometric instrument-compass for a practical use that allows the trisection of an arbitrary angle as well as retains its effective functionality for operations that can be performed by the conventional compass is disclosed. The design proposed makes this new compass universal in terms of its applicability, namely, it can be used in a vertical position as the conventional compass (depending on the purpose or convenience of the user) and can be used in horizontal position (if it is required to perform the trisection of an angle or even some other operations generally performed by the conventional compass). The simplicity of the design and effectiveness of operations makes this instrument an attractive tool for practical application.

13 Claims, 4 Drawing Sheets

COMPASS WITH ANGLE TRISECTING CAPABILITY

RELATED APPLICATIONS

This application claims priority to U.S. Provisional Application No. 60/010,718, filed Jan. 29, 1996, the contents of which is incorporated herein by reference in its entirety.

BACKGROUND OF THE INVENTION

For thousands of years, angle trisection by means of a ruler and compass has been a problem of interest. In order to realize the significance of this problem, I would like to bring the readers' attention to a few-historical facts that are directly related to it.

The above mentioned problem is so old that it goes back to the ancient times. Even the eminent Archimedes (287–212 B.C.) was trying to solve this problem. Thousands of mathematicians of all generations have thought to solve this problem. Like a magnet it attracts and fascinates the minds of people.

On some occasions, those who have proclaimed to have solved the problem would receive enormous attention, and the issue had been widely advertised in the press. For example in 1931 the president of Duquesne University, Jeremiah Joseph Callahan, declared that he had solved the problem. "TIME" magazine has written an article about the discovery. However, eventually it has been proven that Callahan's solution is wrong.

In 1960, the honorable Daniel Inouye, who represented Hawaii in Congress, had given a speech in which he glorified the achievements of artist M. Kidgell, who according to him was able to solve this problem. M. Kidgell and K. Young has written a book "Two hours, which shook the mathematical world". In 1959 both of the authors traveled all over the U.S. to give lectures about the remarkable achievements of M. Kidgell. San-Francisco TV has even made a special show "Puzzle of Centuries". According to Congressman Inouye the Kidgell solution is taught in hundreds of schools and colleges in the U.S. and also in Canada. The Kidgell solution, however, was also proven to be wrong.

Although, there is already a rigorous proof that this problem cannot be solved with the use of a compass, many people are still trying to solve it, and the French Academy of Science has set a special prize in the case of a solution.

In some other cases, people have proposed new devices that would perform angle trisection. An example is the device of London attorney A. Kempe (shown as FIG. 1A) or another device (FIG. 1B). However, as one may notice, these devices are limited just to the solution of the problem of an angle trisection, and therefore they have only a historical interest.

In general, it must be emphasized that the instruments, which have been invented so far, were proposed and designed in such a way that they would be limited only to perform the solution of the trisection problem or division of an angle into equal parts. Also, they are more complicated than is in fact needed (as will be demonstrated here) to solve the problem of angle trisection.

In view of this, I must immediately indicate that the instrument which is proposed here is not only new in terms of its design and operation to perform the trisection, it is also distinguished from the aforementioned geometric instruments by the fact that its functionality is not limited to the solution of the trisection problem. This new invented instrument may perform all the necessary operations as effectively as the conventional compass.

Let me start with the presentation and solution of a problem that is directly related to this new invention and helps to understand the mathematical background and correctness of the new compass in its operation.

Given: The triangle ABO such, that the side AB=BO, i.e. ABO is an isosceles triangle.

Prove: The angle DAC=$\alpha$ is a third of the angle DOC=3$\alpha$? (see FIG. 2).

Solution: Since ABO is an isosceles triangle, then the angle BAO=BOA=$\alpha$(=DAC). Now, since the angle DBO is an exterior angle, then it is equal to the sum of the angles BAO and BOA, i.e. equal to 2$\alpha$. By considering the triangle DBO, we can see that it is also. an isosceles triangle, since the sides BO and OD are equal as radiuses. This, in turn, means that the angle ODB is equal to the angle DBO and is equal to 2$\alpha$. Finally, the consideration of the triangle DAO and the angle DOC (which is an exterior angle) suggests that DOC is equal to the sum of the angles BAO=$\alpha$ and ODB=2$\alpha$. Thus, DOC=3$\alpha$.

This proves the above statement that the angle DAC=$\alpha$ is a third of the angle DOC=3$\alpha$. It also raises an important question, namely, can we construct, by means of a conventional compass, an angle which is a third of an arbitrary given angle and thus to solve the problem of angle trisection.

As a matter of fact, this problem was constructed by Archimedes, when he was considering to solve the trisection problem. He was trying to find, exactly, the point B (or A) such, that after the line was drawn through points B (or A) and D by intersecting the extension of the line OC, the segment AB would be equal to the radius of the circle. As it turned out, it was impossible.

However, as we will learn in the next section, the newly proposed compass easily allows the trisection of an arbitrary angle.

SUMMARY OF THE INVENTION

Here I will describe the main concept of the new compass without the specifics of its design, namely, mechanical details such as: type of pencil and needle attachments, lengthening arm, spring ring hinge etc. These specifics require a detailed consideration. Therefore, the actual design of the proposed compass will be given later.

The main idea behind of the new compass is that it should be designed in such a way that it can also be situated horizontally (as opposed to the conventional compass).

The schematic explanation of the new compass's features and functioning, are understood in the process of the consideration of the problem of an angle trisection.

Given: An arbitrary angle AOB=3$\alpha$.

Find: An angle which is ⅓ of the angle AOB, i.e. angle $\alpha$ and by that means perform the trisection of the angle AOB? (See FIGS. 3).

Let me first turn your attention to the instrument (compass) schematically illustrated in FIG. 4 and to describe each of its points. In the point P we have the pencil which is situated vertically, i.e., perpendicular to the plane of the page. Similarly, in the point N is situated the needle. The point M represents a flexible but preferably locking hinge. As one may see, the arm PM has an elongated extension ME. In general, the pencil and needle can be adjustable in terms of their positioning (either both are positioned vertically with respect to the plane or both are positioned horizontally). However, it is essential that, when we use this compass for the trisection of an angle, the pencil and needle be positioned vertically and the extension ME (of the arm PM) should be at least twice as long as PM or NM. Here, I would like to emphasize that we still do not have any restrictions on the sizes, i.e. they all are arbitrary and can be designed at our convenience.

After these adjustments have been made, we may proceed with the above stated problem of trisection and in the mean time to see this new instrument—compass—in operation (See FIGS. 5, 6 and 7).

Setting the arms of the compass such that the distance between the points P and N is equal to PM (or NM), we situate the needle N in the point O—the vertex of the angle AOB and draw a circle as shown in FIG. 5. Next, draw extension of the line BO (using the ruler or even we can use the elongated extension ME of the new compass which, by the way, plays a role of a ruler in the process of trisection) to the left with an approximate length twice (at least) of the radius of the circle as in FIG. 6. Now, we unlock the hinge and continually move the point P of the compass along the extended line BO, while the point N (the needle) is in the point O (center of the circle) and point M (the hinge) travels along the circle until the extension ME will intersect the point A as shown in FIG. 7. In this position, by using the extension ME we draw a line (or mark two points along ME). Then, using the ruler, this line must be continued till it intersects with the extension of the line BO at the point C as shown in FIG. 7. The angle ACB, which has been constructed, is exactly the ⅓ of the initially given angle AOB. The rest is very simple and does not need an explanation.

Thus, the trisection of an angle has been done by means of the new compass. In the meantime, the new compass has been demonstrated in work and as we could see it has also performed such an operation as circle drawing—similar to the conventional compass.

Its In general according to one aspect, the inventive compass comprises a first arm member which has a graphite pencil, for example, at its end. An elongate arm member is jointed to the first arm member, with preferably a locking mechanism in the preferred embodiment for the joint. A second scribing device, preferably a needle, for example, is located at an end of the second arm member.

In embodiments, at least one of the first scribing device and the second scribing device, preferably both, is movable between a first orientation in which it extends longitudinally with respect to the corresponding arm member and a second orientation in which it extends orthogonally to the corresponding arm member.

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a limitation of the invention. The principles and features of this invention may be employed in various and numerous embodiments without the departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE DRAWINGS

Figure 1A:
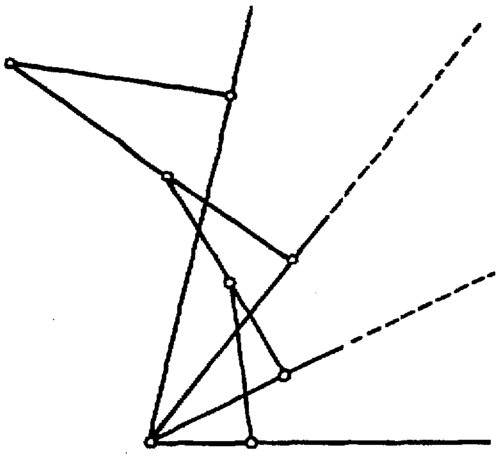
FIGURE 1A Prior Art
FIGS. 1A and 1B are prior art instruments for performing the trisection of an angle.
Figure 1B:
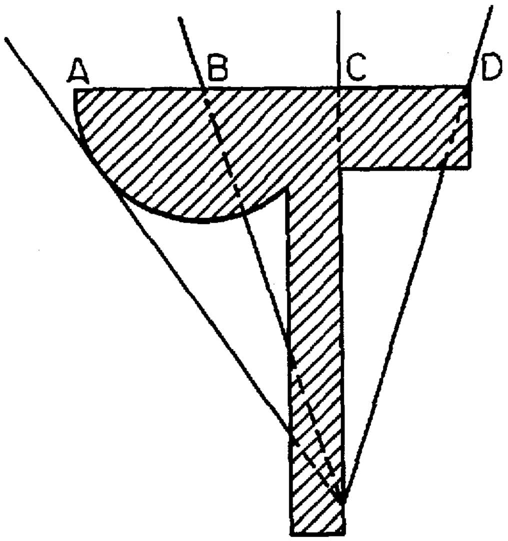
FIGURE 1B Prior Art
Figure 2:
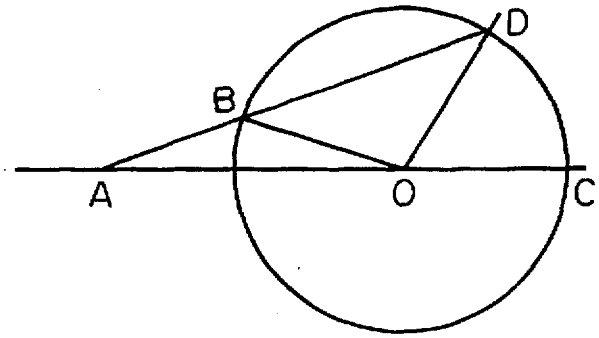
FIG. 2 is a description of the problem, constructed by Archimedes, that is related to the trisection of an angle.
Figure 3:
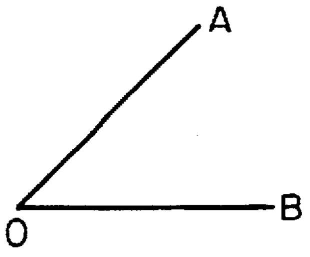
FIGS. 3, 5, 6, and 7 are descriptions of the procedure for performing the trisection of an angle, based on the inventive compass.
Figure 4:
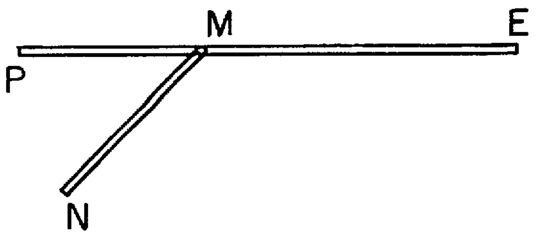
FIG. 4 is a schematic illustration of the inventive compass.

The new compass, according to the present invention as illustrated in FIGS. 4, 8A, 8B, 9A and 9B, comprises two main components—an arm member 10 (NM) that has an adjustable needle pointer scribing device 11 (point N), an elongated arm member 12 (PE) that has an adjustable pencil pointer scribing device 13 (point P), and the extension 14 (segment ME, which also can be designed to be adjustable). The needle pointer 11 is used to locate the end of the arm member on the writing medium used, and the pencil pointer 13 is used to write lines on the writing medium.

It is important to indicate that the extension 14 (segment ME) need not be a separate member, but is preferably part of the arm member 12 (PE), i.e., simply the elongation of the segment PM. The arms 10 and 12 are connected by the flexible hinge joint 15 (point M) so, that they can rotate around this hinge. The flexible hinge 15 (point M) should be made in such a way that it can also be tightened up or locked, so that the arm members 10 (NM) and 12 (PE) will be in a fixed position.

Figure 5:
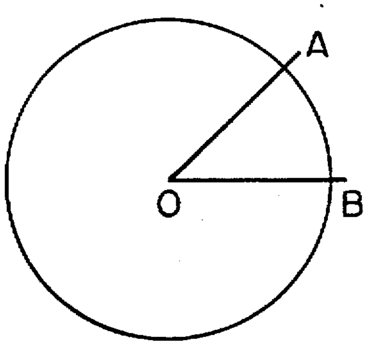
Figure 6:
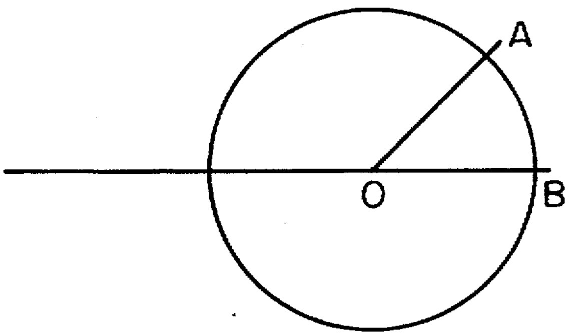

The length of the arm 10 (NM) should be equal to the length of the part of the arm 12 (segment PM) (i.e. without the extension 14). There should be inscribed indications of the length of the segments (NM or PM) somewhere on the compass (e.g., 3 inches). This is an important fact used in the procedure of the angle trisection, namely, when we have to draw a circle (shown in FIG. 5) the points P and N must be set on the distance equal to the length of these segments.

Figure 7:
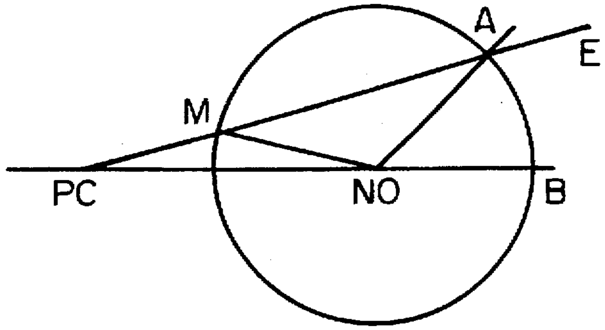
Figure 8A:
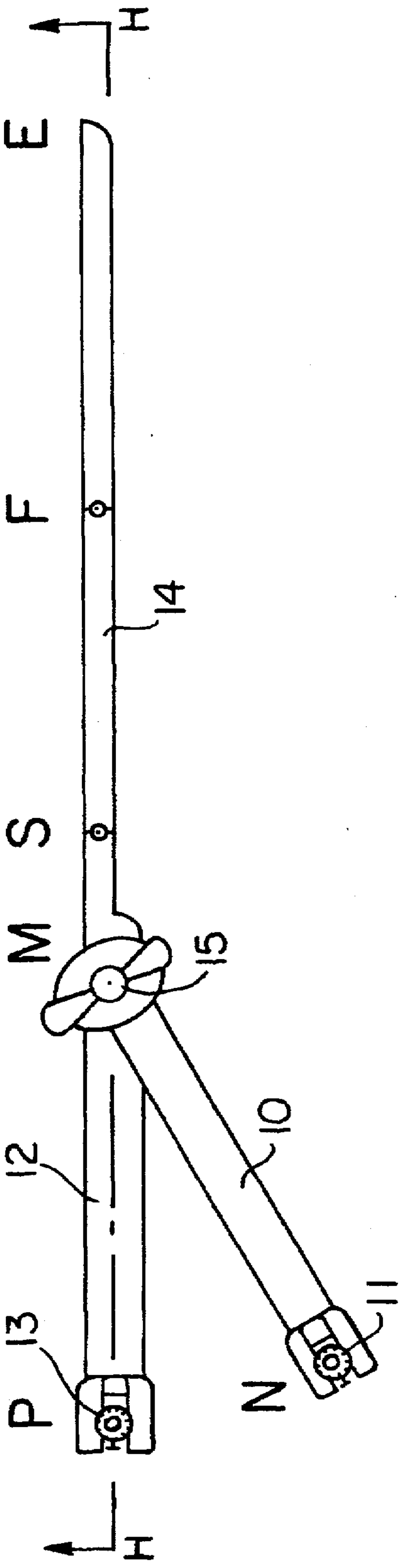
FIG. 8A is a plan view of the inventive compass.

The length of the extension 14 (segment ME) should be at least twice the length of (PM or NM), in order to provide the trisection of very small angles. The extension 14 (segment ME) has also a specific design of its width. One of its edges should be aligned with the pencil pointer 13 (point P) as shown in FIGS. 8A by dashed line. This requirement is important, since the points along the edge of the extension 14 (segment ME) have to be aligned with the points A and C as shown in FIG. 7. However, the extension 14 (segment ME) can be designed to be adjustable, namely, it can be folded up once or even twice around the points F and/or S shown in FIGS. 8A and 8B, or it can be made to be even removable. This will make the new compass more compact instrument, especially, when it is not used for one of the procedures of the trisection of an angle shown in FIG. 7.

Figure 8B:
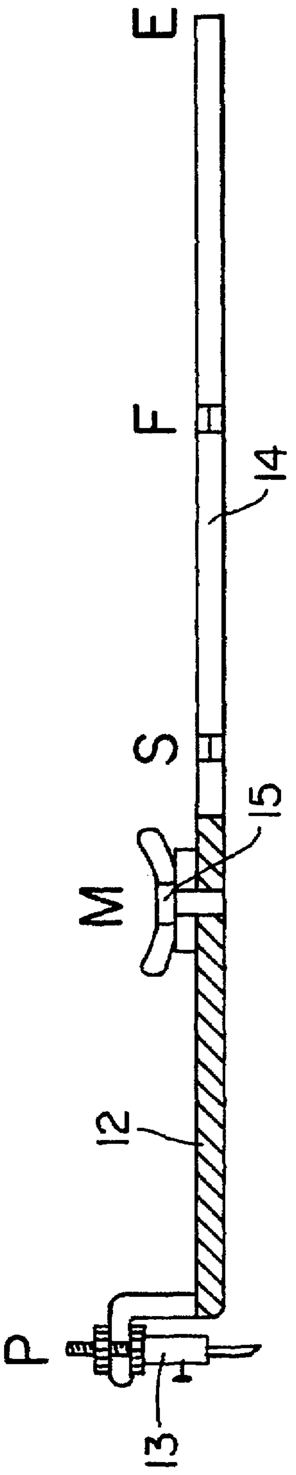
FIG. 8B is a side sectional view, taken along H—H in FIG. 8A, of the inventive compass.

The details of the design of an adjustable needle pointer 11 (point N) and an adjustable pencil pointer 13 (point P) is given in FIGS. 8A and 8B. Here, they both are positioned vertically, i.e., perpendicular to the plane, and this is exactly how they should be situated if the new compass has to perform the trisection of an angle.

Figure 9A:
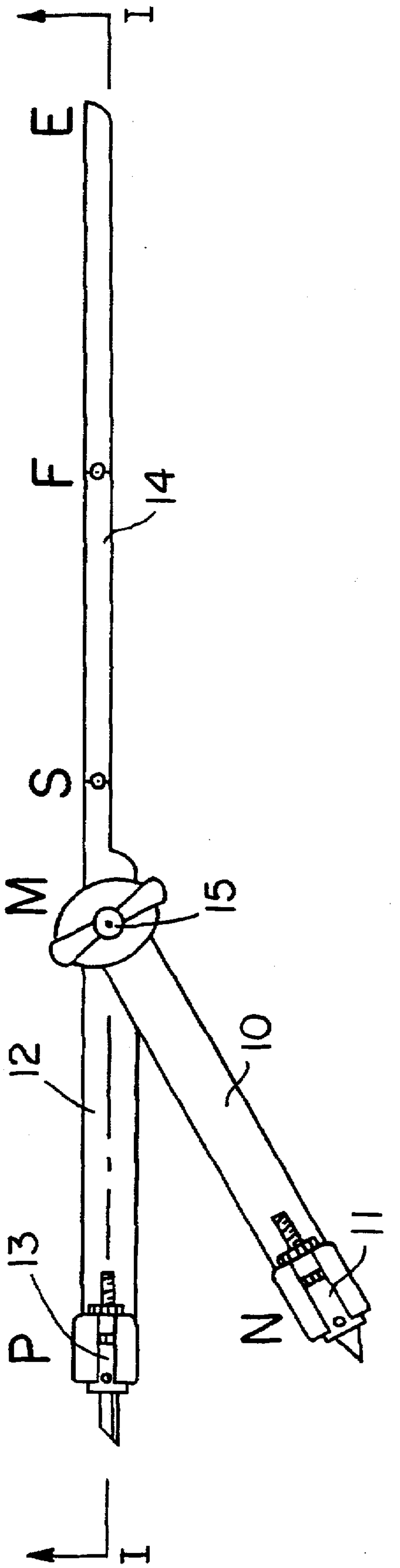
FIG. 9A is a plan view of the inventive compass when configured to operate as a typical compass.
Figure 9B:
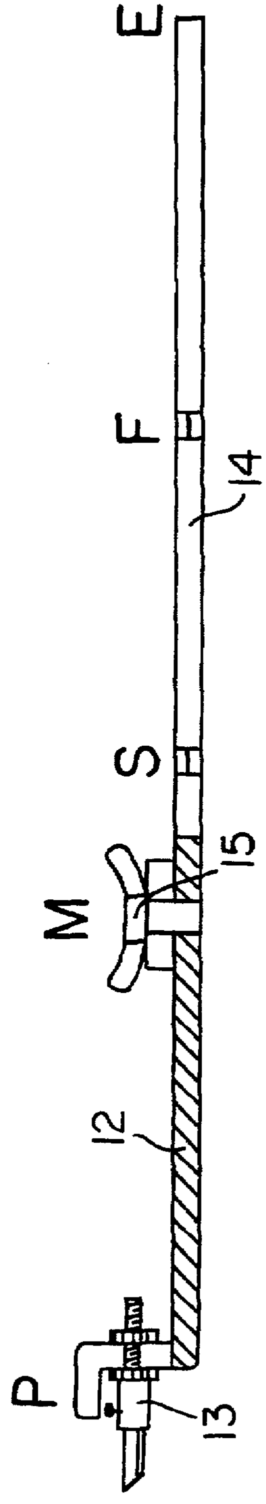
FIG. 9B is a side sectional view, taken along I—I in FIG. 9A.

If the new compass is used for any other purpose, not trisection, then the needle 11 and pencil 13 pointers can also be positioned horizontally or longitudinally with respect to the corresponding arms, i.e., parallel to the plane of the paper as shown in FIGS. 9A and 9B. However, there is no obligation to make these adjustments, since the inventive device can perform all the geometric operations (related to the conventional compass) when configured as shown in FIGS. 8A and 8B.

The fact that the parts are adjustable, makes the new compass universal.

While this invention has been particularly shown and described with references to preferred embodiments thereof, it will be understood by those skilled in the art that various changes in form and details may be made therein without departing from the spirit and scope of the invention as defined by the appended claims.

I claim:

1. A compass comprising:

a first arm member having a locating pointer at a distal end;

a second arm member having a writing pointer at a distal end;

a joint, having a locking mechanism between the first arm member and the second arm member, fixed at proximal ends of the first arm member and the second arm member such that the first arm member and the second arm member are substantially the same length; and an extension of the second arm member that extends the second arm member proximally of the joint.

2. The compass described in claim 1, wherein the locating pointer is a needle.

3. The compass described in claim 1, wherein the writing pointer is graphite pencil pointer.

4. The compass described in claim 3, wherein the locating pointer is a needle.

5. The compass described in claim 1, wherein the extension has markings indicating length along it and has an edge that is aligned with the writing pointer.

6. The compass described in claim 1, wherein at least one of the locating pointer and the writing pointer is movable between a first orientation in which it extends longitudinally with respect to the corresponding arm member and a second orientation in which it extends orthogonally to the corresponding arm member.

7. The compass described in claim 1, wherein the extension of the second arm member is at least twice as long as the first arm member or second arm member.

8. A compass comprising:

a first arm member having a locating pointer at an end of the first arm member which is movable between a first orientation in which it extends longitudinally with respect to the first arm member and a second orientation in which it extends orthogonally to the first arm member;

a second arm member having a writing pointer at an end of the second arm member which is movable between a first orientation in which it extends longitudinally with respect to the second arm member and a second orientation in which it extends orthogonally to the second arm member;

a fixed joint between the first arm member and the second arm member positioned at proximal ends of the first arm member and the second arm member such that the first arm member and the second arm member are substantially the same length; and an extension of the second arm member that extends the second arm member proximally of the joint and is at least twice as long as the first arm member or second arm member, an edge of the extension being aligned with the writing pointer.

9. The compass described in claim 8, wherein the locating pointer is a needle.

10. The compass described in claim 8, wherein the writing pointer is graphite pencil pointer.

11. The compass described in claim 10, wherein the locating pointer is a needle.

12. The compass described in claim 8, wherein the extension has markings indicating length along it.

13. The compass described in claim 8, further comprising a locking mechanism for the joint between the first arm member and the second arm member.

* * * * *